March 4, 1941.  G. HAGEDORN ET AL  2,233,526
APPARATUS FOR DOUBLE SPOT OR SEAM WELDING
Filed Sept. 28, 1938  3 Sheets-Sheet 1

G. Hagedorn
W. Hass
Inventors

By Glascock Downing & Seebold
Attys.

March 4, 1941.  G. HAGEDORN ET AL  2,233,526
APPARATUS FOR DOUBLE SPOT OR SEAM WELDING
Filed Sept. 28, 1938  3 Sheets-Sheet 2

G. Hagedorn
W. Hass
Inventors

By: Glascock Downing & Seebohm
Attys

Patented Mar. 4, 1941

2,233,526

UNITED STATES PATENT OFFICE 2,233,526

APPARATUS FOR DOUBLE SPOT OR SEAM WELDING

Gerhard Hagedorn, Berlin-Halensee, and Walter Hass, Klein-Machnow, near Berlin, Germany, assignors to Bernhard Berghaus, Berlin-Lankwitz, Germany Application September 28, 1938, Serial No. 232,197
In Germany October 9, 1937

10 Claims. (Cl. 219—4)

The present invention relates to electric welding apparatus and more specifically pertains to such apparatus for spot or seam welding.

In the specification of a concurrent patent application Serial No. 141,796 now Patent No. 2,137,909 dated Nov. 22, 1938, there is described a method of double spot or seam welding in which use is made of two electrodes lying next to one another on a part of the material to be welded without counter electrodes, the current flowing through the upper metal sheet being reduced with respect to the current flowing through the lower metal sheet by current displacing means which act by electro-magnetic induction, and solid or sub-divided iron being inserted between the electrodes, whereby an improvement in the ratio of welding current to loss of current, as well as a reliable welding, is obtained, without the surface of the metal sheet being damaged.

The primary or secondary current of the welding transformer may thereby produce the magnetic field for the displacement of the current. Moreover an electro-magnet may be so arranged between the electrodes for the displacement of the current that its field penetrates the material to be welded substantially at right angles to the welding current between the electrodes.

The present invention provides apparatus for carrying out the method described in the patent, and according to one feature the transformer iron of the welding transformer constitutes at the same time the iron between the electrodes. In addition to a more simple construction this form has the great advantage that the secondary conductor can be made substantially shorter, whereby losses are reduced. With such an arrangement the use of separate iron is no longer required. The invention is especially advantageous if use is made of a welding transformer operated by medium or high frequency currents.

A further form of apparatus for carrying out the method described in the above patent includes a current displacing conductor lying on the material to be welded or at a short distance therefrom and so constructed that it completely surrounds the two welding electrodes to within a short distance of the ends thereof and extends over the whole zone of flow of the welding current. The current displacing conductor is preferably branched off the electrode current leads over a current regulating loop.

In the current regulating loop there is preferably displacedly arranged a laminated iron core for regulating the impedance of the loop. In the current regulating loop there may also be inserted an adjustable ohmic resistance of a self inductance. The current flowing in the current displacing conductor must have as much as possible the same phase and the same direction as the welding current. The electric conduction of the material constituting the current displacing conductor is preferably so chosen, that by taking into consideration its resistance and its self-inductance the phase displacement of the current with respect to the voltage is the same in the current displacing conductor as in the welding circuit.

The welding transformer and the current displacing circuit connected thereto are preferably supplied with an alternating current of 1,000 to 20,000, preferably 5,000 to 8,000, cycles per second, from a high frequency transformer, since the action of the current displacement increases with increasing frequency.

According to the invention especially good welding spots which are symmetric with respect to the impression of the electrodes are obtained without the surface being damaged if the displacing conductor extends over the whole zone of flow of the welding current, that is to say, if it is constructed as a plate with openings for the electrodes. The displacing current must flow in the same direction as the welding current. Accordingly the feeding of the displacing plate is effected in such a manner that the phase displacement of the two currents is approximately the same. The simplest arrangement is to connect the current displacing apparatus in parallel with the welding electrodes to the transformer. In order to obtain the correct position of phase of the displacing current, the plate is made of a material having a suitable electric conduction. An ohmic resistance may be inserted at any desired point. Further it is important to use for the plate a material having magnetic properties which correspond to those of the material to be welded. The ratio between the displacing and welding current may be regulated in a very simple manner by constructing the lead to the displacing plate as a loop, into which the packet of iron sheets is inserted to a small or great extent.

By the present invention the apparatus for double spot or seam welding according to the application referred to is further modified by the feature, that the welding transformer forms at the same time the electro-magnet for the displacement of the current. In order to obtain a sufficient current displacing effect use must be made of a frequency of over 1,000, preferably between 5,000 and 20,000, cycles per second. The magnetic field which naturally has the frequency of the welding current is directed, as much as possible, in an opposite direction to the stray flux of the welding current. The double spot welding transformer is so arranged that its main magnetic field penetrates the loop formed by the two electrodes and the material to be welded. Further, the transformer may be provided with two outer fields extending in an opposite direction to the main field which extends between the electrodes. In this way the advantage is attained, especially in the case of high frequencies, that the outer zones of the electrodes are not overloaded and the material to be welded is not attacked at these points, which might easily arise in the case of too strong an inner displacing field. In the case of an outer and inner displacing field stronger fields may sometimes be used.

According to the invention the limbs of the iron core of the double spot welding transformer are arranged between the two electrodes in the proximity of the material to be welded and, therefore, the iron core has at this point an air gap. In the case of an inner and outer displacing field according to the invention two three-limb cores are arranged a certain distance apart with the pole surfaces opposite one another, and the electrodes are arranged between the middle and outer core in the air gap.

The invention further relates to a double spot welding transformer, the characteristic feature of which is that its primary winding serves for the displacement of the welding current. The primary winding is preferably constructed as a disc winding, being slightly brought out of the secondary winding on the side facing the sheets to be welded and being brought as close as possible on to the metal sheet. The connecting ends of the secondary winding must be crossed, so that the current in the material to be welded and in the primary winding have the same direction; since the primary and the secondary current of a transformer have a phase displacement of nearly 180°. The double spot welding transformer is preferably supplied with an alternating current having a frequency higher than the usual frequency of 50 or 60 cycles per second, preferably 1,000 to 10,000 cycles per second, since only in that case can the current distribution in the material to be welded be favourably influenced by current displacement as regards the formation of the welding spots and the quality of the surface of the material. The use of the primary winding of the welding transformer for current displacement has the advantage that no current displacing means operated by an external current are required, and thus losses of energy are avoided. The double spot welding transformer has the further advantage that counter electrodes are no longer required for double spot welding.

The invention is illustrated by way of example in the accompanying drawings, showing various forms of construction for carrying the invention into effect.

Figure 1:
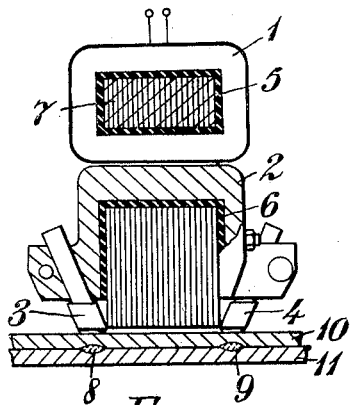
Fig. 1 is a section through apparatus for double spot or seam welding.
Figure 2:
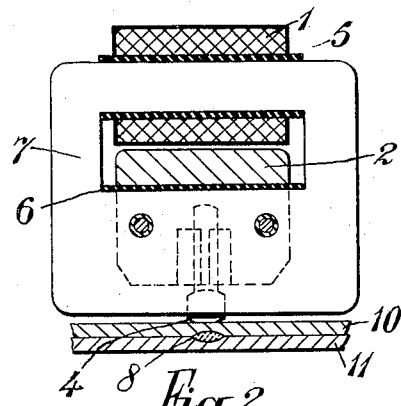
Fig. 2 is a side view of the apparatus according to Fig. 1.

Referring to Figures 1 and 2, 1 is the primary winding, and 2 the secondary winding, which preferably forms a secondary bridge for electrodes 3 and 4. The primary winding 1 is insulated from a limb of a core 7 by means of insulating material 5 and insulation 6 is interposed between the secondary winding 2 and the core 7. The limb of the core adjacent the material to be welded is preferably made thicker as shown in Fig. 2 so that the magnetic flux produced by the welding current encounters a small resistance in the iron. The electrodes project by a fraction of a millimetre beyond the iron of the core 7. By the magnetic field being built up on one side with respect to the welding current, the same is automatically displaced away from the iron. The two welding spots are indicated at 8 and 9 which unite the metal sheets 10 and 11.

Figure 3:
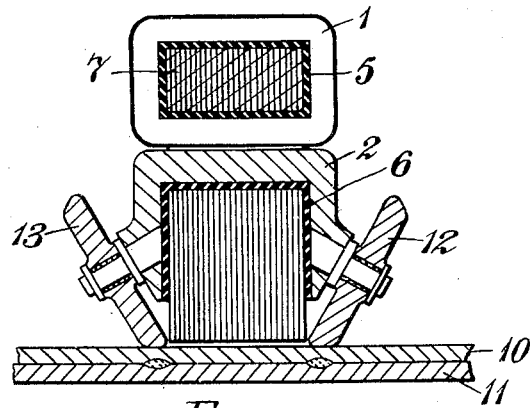
Fig. 3 is a sectional view of apparatus for double spot or seam welding in which roller electrodes are used.

The apparatus according to Figure 3 differs from the apparatus shown in Figures 1 and 2 in that welding rollers 12 and 13 are provided for the seam welding.

Figure 4:
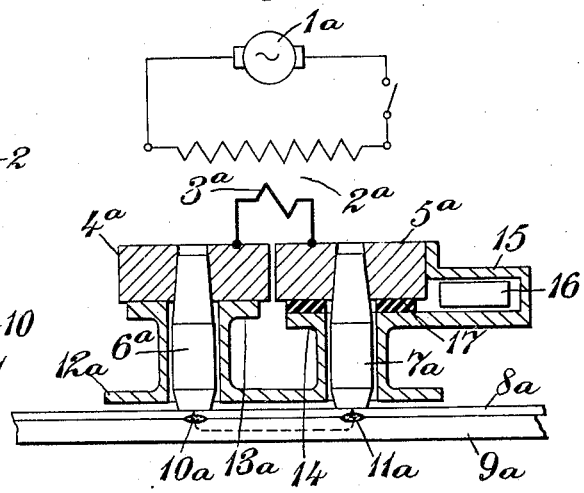
Fig. 4 is a vertical section through a further form of apparatus for double spot welding without counter electrodes having a current displacing plate penetrated by the electrodes.
Figure 5:
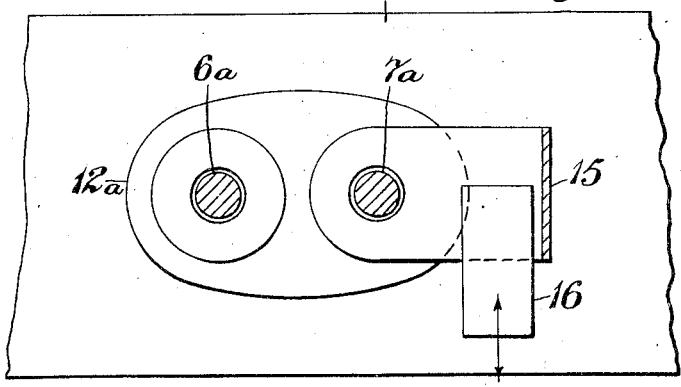
Fig. 5 is a sectional plan view of the apparatus according to Fig. 4.

Referring to Figures 4 and 5, a source of alternating current is indicated at 1a, for instance, a source of high frequency of 1,000 to 20,000, preferably 5,000 to 8,000, cycles per second, from which current is supplied to the high frequency transformer 2a over a switch, the secondary coil 3a of which is connected with the holders 4a and 5a of the welding electrodes 6a and 7a. The parts to be welded together, for instance, two metal sheets 8a and 9a are united together by the welding spots 10a and 11a. The current displacing conductor 12a lying on or near the upper sheet 8a is constituted in the form of a plate provided with two holes, which completely surrounds to within a short distance of the ends thereof the two welding electrodes 6a and 7a and the member 12a extends over the whole range of flow of the welding current flowing through the sheets 8a and 9a. The current displacing conductor is connected to the one electrode holder 4a by means of the part 13a and over the part 14 and a current regulating loop 15 to the holder 5a of the other electrode. The part 17 is an insulating ring. In the current regulating loop 15 there is displaceably arranged a solid or sub-divided iron core 16 for the regulation of the impedance of the loop. The displacing plate may also be connected in series with the secondary winding of the transformer.

Figure 6:
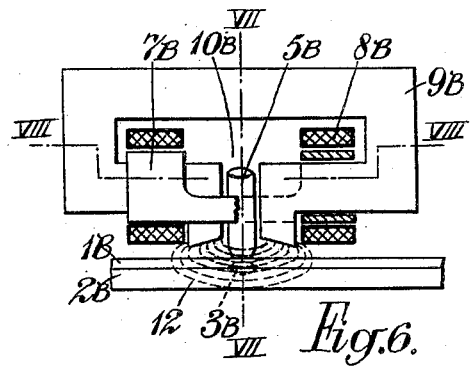
Fig. 6 is a section through apparatus for double spot or seam welding in which the welding transformer forms at the same time the electro-magnet for the displacement of the current.
Figure 7:
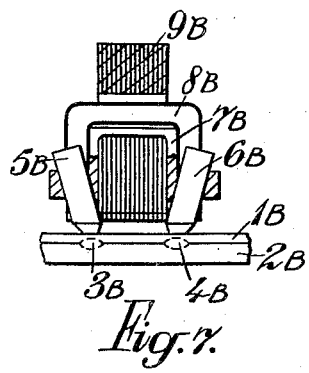
Fig. 7 is a section along the line VII—VII of Fig. 6.
Figure 8:
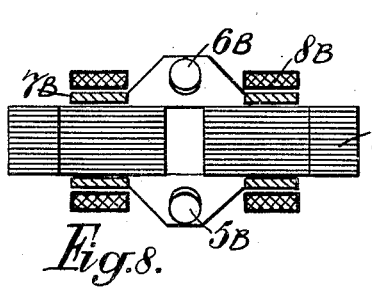
Fig. 8 is a section along the line VIII—VIII of Fig. 6.

Referring to Figures 6, 7 and 8, the metal sheets 1B and 2B to be welded together, are united by the welding spots 3B and 4B. The two welding electrodes 5B and 6B are connected to the secondary coil 7B of the welding transformer. The primary winding 8B of the welding transformer is mounted on an iron core 9B which has a gap 10B in which the electrodes are arranged. The pole shoes are preferably made of such a form that the transformer main magnetic field 12B between the poles is as flat as possible, or penetrates the sheets 1B and 2B tangentially. The welding current then encloses as many lines of force of the main field as possible, that is to say, it flows preferably in the outer zones of the electrodes and in the lower metal sheet.

A further advantage obtained with this arrangement is that the self-inductance of the conductor loop formed by the electrodes and the material to be welded is compensated to a large extent, which substantially reduces, especially in the case of high frequencies, the secondary apparent output of the transformer, thereby substantially influencing its value.

Figure 9:
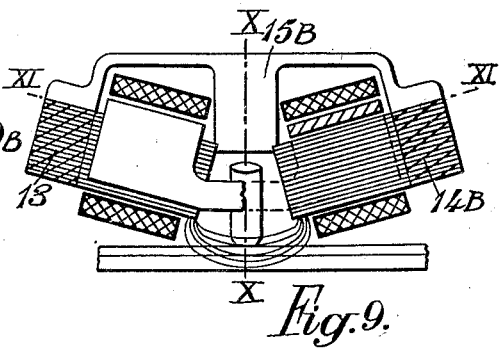
Fig. 9 is a section through a form of construction of double spot welding transformer for current displacement.
Figure 10:
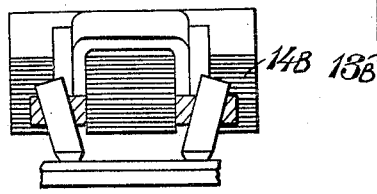
Fig. 10 is a section along the line X—X of Fig. 9.
Figure 11:
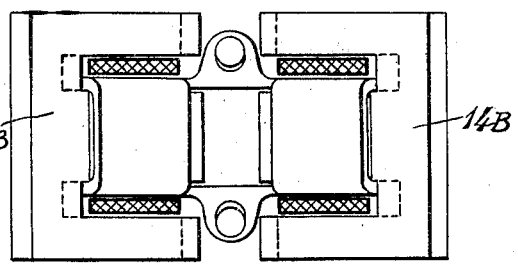
Fig. 11 is a section along the line XI—XI of Fig. 9.

Although this arrangement enables many double spot welds to be obtained, it is more efficient and better, especially in the case of high frequencies and thicknesses of metal sheets of over ½ mm., to provide the transformer with two further outer fields in opposite direction to the field running between the electrodes, as shown in Figures 9 to 11. In this way it is avoided that the intensity of the current flowing through the outer zones of the electrodes is so great as to cause inadmissibly high current densities, which must be avoided, so that the surface of the metal sheets shall not be damaged. In the simplest way the three fields are obtained by using two three-limb cores 13B and 14B, which are kept in an inclined position with respect to one another by a non-magnetic holder 15B. The inclined position of the cores with respect to one another results in an especially flat field and a favorable displacing action.

Figure 12:
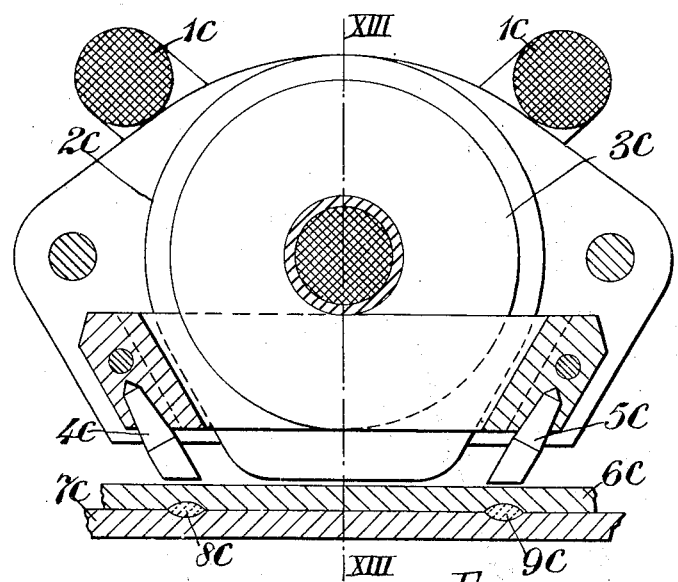
Fig. 12 is a vertical section through a double spot welding transformer.
Figure 13:
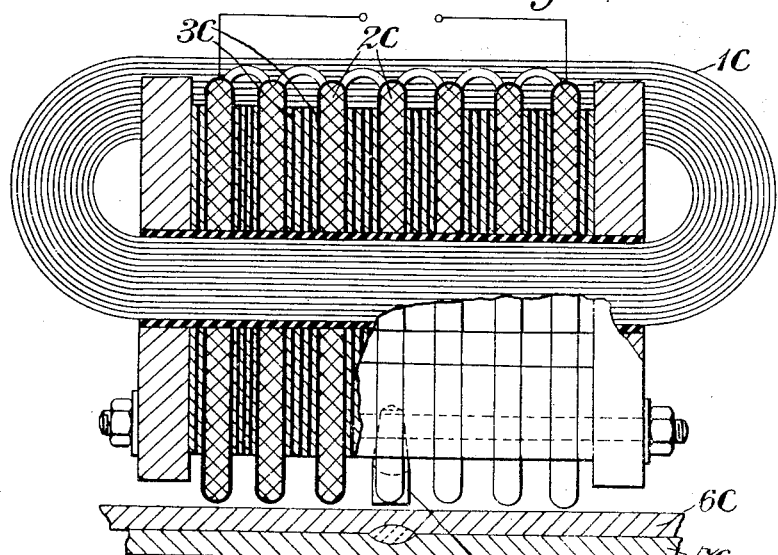
Fig. 13 is a partial section along the line XIII—XIII of Fig. 12 as well as a partial side view.

In Figs. 12 and 13 the iron core of the transformer is represented at 1C and may consist of iron wire. The transformer is provided with a disc-like primary winding 2C for the current displacement. The secondary winding is represented at 3C and the ends thereof are connected to the welding electrodes 4C and 5C. The electrodes are adapted to engage metal sheets 6C and 7C which are united by weld spots 8C and 9C.

What we claim is:

1. Apparatus for double spot or seam welding of two metal sheets by means of two electrodes lying next to one another on one of the metal sheets without any counter-electrodes, comprising in combination with the two electrodes a welding transformer, the iron core of which lies between the electrodes and extends towards the metal sheet nearly as far as the ends of the electrodes intended to rest on said sheet, whereby the said iron core when energized acts by electro-magnetic induction as a current displacer by reducing the current flowing through the upper metal sheet with respect to the current flowing through the lower metal sheet.

2. Apparatus as claimed in claim 1, in which the welding transformer has three limbs, of which the central one constitutes the iron core which lies between the two electrodes and has at this point an air gap, whereby its main magnetic field penetrates the loop formed by the two electrodes and the metal sheets, the other two limbs forming poles for producing magnetic fields directed in opposite direction to the main magnetic field between the electrodes.

3. Apparatus as claimed in claim 1, in which the welding transformer has two three-limb cores arranged a certain distance apart with the pole surfaces opposite one another, the central limbs lying between the two electrodes and leaving at this point an air gap, whereby the main magnetic field penetrates the loop formed by the two electrodes and the metal sheets, the outer limbs of both three-limb cores forming poles for producing magnetic fields directed in opposite direction to the main magnetic field between the electrodes, and said electrodes being arranged in the air gap between the central and outer limbs.

4. Apparatus as claimed in claim 1, in which the welding transformer is a shell transformer with air gap, the electrodes being arranged in the air gap between the middle and outer core of the shell transformer.

5. Apparatus for double spot welding of two metal sheets by means of two electrodes lying next to one another and facing one of the metal sheets without any counter-electrodes, comprising in combination with the two electrodes a welding transformer having a primary and a secondary winding in which the primary winding extends into the space between the electrodes nearly as far as the ends of the latter, whereby the primary winding when energised acts by electro-magnetic induction as a current displacer by reducing the current flowing through the upper metal sheet with respect to the current flowing through the lower metal sheet.

6. Apparatus as claimed in claim 5, in which the primary winding of the welding transformer is in the form of a disc winding which projects beyond the secondary winding on the side where the electrodes face the metal sheets, the ends of the secondary winding being so connected to the electrodes that the current in the metal sheets and in the primary winding will have the same direction.

7. Apparatus for double spot or seam welding of two metal sheets by means of two electrodes lying next to one another on one of the metal sheets without any counter-electrodes, comprising in combination with said two electrodes a welding transformer having one of its electro-magnetically operative parts lying between the electrodes and extending towards one of the metal sheets nearly as far as the ends of the electrodes intended to rest thereon, whereby the said electro-magnetically operative part acts by electro-magnetic induction as a current displacer by reducing the current flowing through the upper metal sheet with respect to the current flowing through the lower metal sheet.

8. Apparatus for double spot welding two adjacent metal sheets without counter electrodes comprising in combination, two spaced electrodes engaging a face of an upper metal sheet, a plate arranged adjacent the upper metal sheet having openings therein through which said electrodes project, a welding transformer including a secondary winding connected across said electrodes and said plate, and the resistance of said plate in relation to a circuit formed between the electrodes by the metal sheets being such as to shunt only a portion of the welding current passing through the electrodes whereby the current flowing through the plate displaces the welding current from the upper sheet into the lower sheet so as to reduce the welding current flowing in the upper sheet with respect to the welding current flowing in the lower sheet.

9. Apparatus for double spot welding two adjacent metal sheets without counter electrodes comprising in combination, two spaced electrodes engaging a face of an upper metal sheet, a plate arranged adjacent the upper metal sheet having openings therein through which said electrodes project, a welding transformer including a secondary winding connected across said electrodes and said plate, and the resistance of said plate in relation to a circuit formed between the electrodes by the metal sheets being such as to shunt only a portion of the welding current passing through the electrodes whereby the current flowing through the plate displaces the welding current from the upper sheet into the lower sheet so as to reduce the welding current flowing in the upper sheet with respect to the welding current flowing in the lower sheet, and means for varying the impedance of said plate circuit.

10. Apparatus for double spot welding two adjacent metal sheets without counter electrodes comprising in combination, two spaced electrodes for engaging one face of an upper metal sheet, a plate arranged adjacent the upper metal sheet having openings therein through which said electrodes project, a welding transformer including a secondary winding connected across said electrodes, means connecting one electrode to said plate, means connecting the other electrode to said plate including a loop member, an iron core movable within said loop member for varying the impedance thereof, and the impedance of said plate circuit being such as to shunt only a portion of the welding current passing through said electrodes and said metal sheets whereby the current flowing through the plate displaces the welding current from the upper sheet into the lower sheet.

GERHARD HAGEDORN.
WALTER HASS.